United States Patent [19]

Yokoyama: Yukio

[11] Patent Number: 5,392,461
[45] Date of Patent: Feb. 21, 1995

[54] PORTABLE RADIO COMMUNICATION APPARATUS UNNECESSITATING SHIELDING CASE

[75] Inventor: Yokoyama: Yukio, Tokyo, Japan

[73] Assignee: NEC Corporation, Tokyo, Japan

[21] Appl. No.: 911,135

[22] Filed: Jul. 9, 1992

[30] Foreign Application Priority Data

Jul. 11, 1991 [JP] Japan .................................. 3-171124

[51] Int. Cl.$^6$ .............................................. H04B 1/38
[52] U.S. Cl. ........................................ 455/89; 455/90; 455/128; 455/129; 455/300; 361/800; 361/818
[58] Field of Search ................... 455/89, 90, 128, 129, 455/300, 301, 351; 361/422, 753, 799, 800, 816, 818; 257/664; 174/35 R, 51, 35 TS

[56] References Cited

U.S. PATENT DOCUMENTS

| | | | |
|---|---|---|---|
| 3,614,546 | 10/1971 | Avins | 257/664 |
| 3,909,726 | 9/1975 | Dobrovolny et al. | 455/301 |
| 4,717,990 | 1/1988 | Tugcu | 174/35 R |
| 4,890,199 | 12/1989 | Beutler | 455/300 |
| 5,206,796 | 4/1993 | Thompson et al. | 174/35 R |

FOREIGN PATENT DOCUMENTS 0346125 6/1989 European Pat. Off. .

OTHER PUBLICATIONS

*IBM Technical Disclosure Bulletin*, "Cooling and Shielding Arrangement for Multilayer Card Assemblies With Cryptographic Functions", vol. 29, No. 9, Feb. 1987, pp. 4021–4022.

Primary Examiner—Curtis Kuntz
Assistant Examiner—Doris H. To
Attorney, Agent, or Firm—Ostrolenk, Faber, Gerb & Soffen

[57] ABSTRACT

A portable radio communication apparatus includes a printed circuit board, an antenna section and a radio section installed on the board, a housing, and a connector. The radio section includes electronic parts of which connecting terminals are connected to the printed circuit board and of which conductor sections formed on outer surface thereof are connected to the grounding section. The housing accommodates therein the printed circuit board, the antenna section, and the radio section. The housing has a conductor film formed on an inner surface thereof. The conductor sections of the electronic parts are connected to the conductor film on the inner surface of the housing via the connector. Since the shielding case and the connector conventionally used are unnecessary, the size and weight of the apparatus can be reduced.

2 Claims, 3 Drawing Sheets

PORTABLE RADIO COMMUNICATION APPARATUS UNNECESSITATING SHIELDING CASE

BACKGROUND OF THE INVENTION

The present invention relates to a portable radio communication apparatus having an antenna disposed therein.

DESCRIPTION OF THE RELATED ART

A conventional portable radio communication apparatus having an antenna section therein includes a printed circuit board on which there are mounted a radio section for processing transmission and reception signals for communications with a base station and the like and an antenna section connected to the radio section for transmitting a transmission signal in the form of a radio wave and for receiving a radio wave from a communicating partner. The radio section, the antenna section, and the printed circuit board are accommodated in a housing made of, for example, a plastic material. There is disposed in the housing a shielding case constituted such that only the radio section is contained therein and the antenna section is arranged to be in a space outside thereof, thereby shielding the radio section. The shielding case is usually formed with a thin plate of a metal. The antenna section is ordinarily connected to the radio section via a connector.

In the portable radio communication apparatus of the conventional type, presence of the shielding case has been a considerable hindrance when minimizing the size and weight of the apparatus. In addition, the requirement of a connector for connecting the antenna section to the radio section is also a hindrance when minimizing the apparatus in its size.

SUMMARY OF THE INVENTION

It is therefore an object of the present invention to provide a portable communication apparatus which unnecessitates the shielding case and the connector, thereby reducing the size and weight of the apparatus.

In accordance with the present invention, there is provided a portable radio communication apparatus having antenna means and radio means which are shielded from an external space, comprising a printed circuit board having a grounding section, antenna means mounted on the printed circuit board, radio means mounted on tile printed circuit board, the radio means including electronic parts, each of the parts having a connecting terminal connected to the printed circuit board and having a conductive section formed on an outer surface thereof, the conductive section being connected to the grounding section; a housing for accommodating therein the printed circuit board, the antenna means, and the radio means, the housing having a conductive film on an inner surface thereof; and connecting means for connecting the conductive section of each of the electronic parts to the conductive film on the inner surface of the housing.

In the portable communicating apparatus according to the present invention, the antenna means is connected to the radio means via wirings disposed on the printed circuit board.

According to the portable communicating apparatus, the conductive film is formed in a region of the housing other than a region thereof where the antenna means is accommodated.

In accordance with the portable communicating apparatus, the electronic parts are disposed in the vicinity of the periphery of the antenna means.

In the apparatus in accordance with the present invention, the connecting means includes metal pieces and elastic projections formed on the metal pieces, the projections connecting the conductive sections of the electronic parts to the conductive film.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
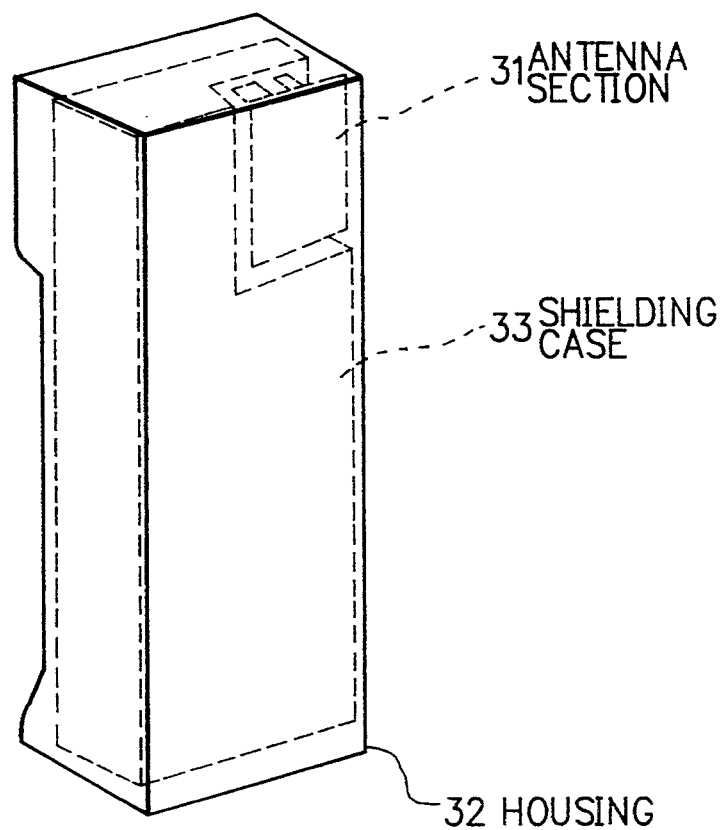
FIG. 1 is a perspective view showing an example of the conventional portable radio apparatus.

Referring now to FIG. 1, a conventional portable radio communication apparatus will be described for a better understanding of the present invention.

FIG. 1 shows an appearance of the conventional portable radio communication apparatus including an antenna section therein. In the radio communication apparatus, a radio section, not shown, for processing transmission and reception signals for communications with a base station and the like and an antenna section 31 linked with the radio section for transmitting a transmission signal in the form of a radio wave and for receiving a radio wave from a communicating partner are mounted on a printed circuit board, not shown. The radio section, the antenna section 31, and the printed circuit board are accommodated in a housing 32 made of, for example, a plastic material. In the housing 32, there is disposed a shielding case 33 constituted such that only the radio section is contained therein and the antenna section 31 is exposed to a space outside thereof, thereby shielding the radio section. The shielding case is ordinarily manufactured with a thin plate of a metal. The antenna section 31 is in an ordinary case coupled with the radio section via a connector (not shown).

In the conventional portable radio communication apparatus of this type, due to presence of the shielding case, it has been quite difficult to minimize the size and weight of the apparatus. Furthermore, since the connector is necessary for connecting the antenna section to the radio section, it has also been difficult to reduce the size of the apparatus.

Figure 2:
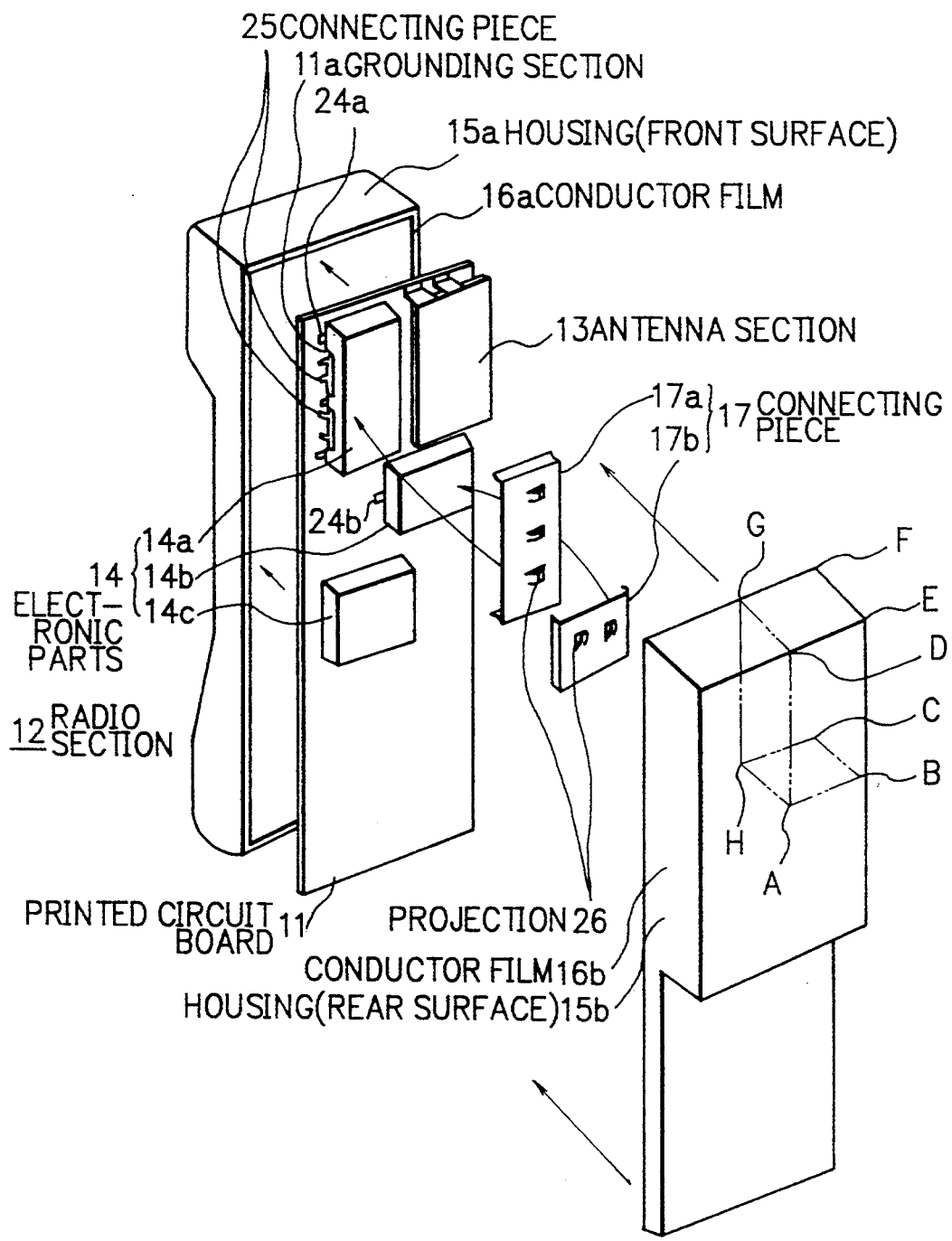
FIG. 2 is a exploded perspective view showing a portable radio communication apparatus in an embodiment according to the present invention.
Figure 3:
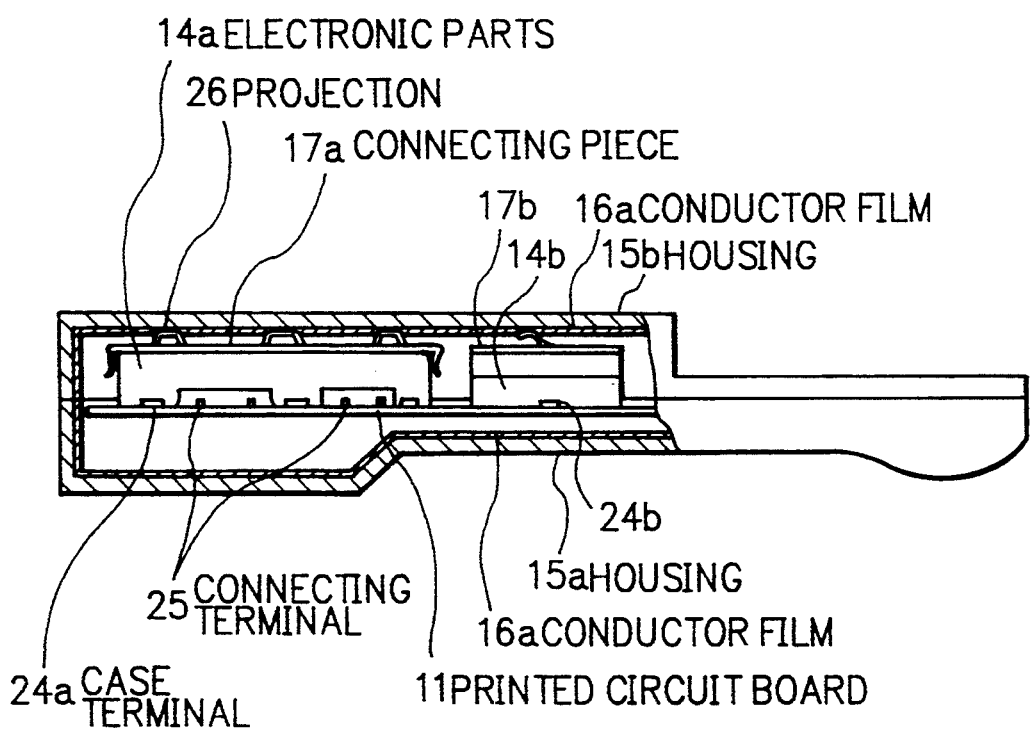
FIG. 3 is a partially cutaway side view of the embodiment of FIG. 2.

FIG. 2 shows a exploded view of a portable radio apparatus in an embodiment in accordance with the present invention, whereas FIG. 3 shows a partially cutaway side view of the apparatus of FIG. 2.

In the embodiment of FIG. 2, a radio section 12 and an antenna section 13 are mounted on a printed circuit board 11. The radio section 12 processes transmission and reception signals for communications with a base station. The antenna section 13 receives a transmission signal from the radio section to emit the signal in the form of a radio wave. In addition, the antenna section 13 receives a radio wave transmitted from a communicating partner and converts the radio wave into a reception signal, thereby sending the signal to the radio section 12. The radio section 12 includes a plurality of electronic parts 14. The parts are representatively shown as electronic parts 14a, 14b and 14c in this diagram. A connecting terminal 25 of the parts 14 is connected to wirings, not shown, on the printed circuit board 11, for example, by soldering the wirings to the terminal 25. Moreover, case terminals 24a and 24b are respectively disposed in the electronic parts 14a and 14b (denoted as 14 in a collective manner) having outer surfaces formed with conductor portions of, for example, a metal case. These case terminals 24a and 24b are, for example, soldered to a grounding section 11a of the printed circuit board 11 to establish an electric connection therebetween. As a radio wave emitting element of the antenna section 13, there is employed, for example, an antenna having a shape of a reversed F. The radio section 12 is connected to the antenna section 13 via wirings disposed on the printed circuit board 11.

Two housings formed with a plastic material or the like, namely, a housing 15a forming a front surface of the apparatus and a housing 15b forming a rear surface thereof are combined with each other to accommodate in a space therebetween the radio section 12, the antenna section 13, and the printed circuit board 11 on which the sections 12 and 13 are mounted. On inner surfaces of the housings 15a and 15b, there are respectively formed electrically conductive films 16a and 16b by plating, coating, or evaporating an appropriate conductive material thereon. The films 16a and 16b electromagnetically shield the radio section 12 from the external space. On the other hand, the antenna section 13 is not desired to be electromagnetically shielded from the external space for the emission and reception of radio waves. In this example, the antenna section 13 is arranged in an open essentially unshielded zone at an upper rear corner of combined housing 15a, 15b with such zone being enclosed by imaginary lines A to H of the housing 15b of FIG. 2. In consequence, the conductive film 16b is manufactured on the housing 15b to form a shielded region for radio elements 14 rather than the open or unshielded zone that enclosed by the lines A to H and wherein antenna section 13 is disposed.

Each of the electronic parts 14a and 14b is an element like a surface acoustic wave (SAW) filter, namely, the element has an outer surface of a conductive material such as a metal case. In the periphery of the antenna section 13, there are disposed the electronic parts 14a and 14b having outer surfaces formed with such a conductive material above. Disposed respectively in the parts 14a and 14b are the case terminals 24a and 24b connected to the outer surfaces formed with a conductive substance. As above, the case terminals 24a and 24b are, for example, soldered to the grounding section 11a of the printed circuit board 11 to establish an electric connection therebetween.

Connecting pieces 17a and 17b are disposed respectively between the electronic part 14a and the housing 15b and between the electronic part 14b and the housing 15b. The connecting pieces are represented without any suffix unless particularly specified. Each of the connecting pieces 17a and 17b is formed with a metal or the like and has an elastic mechanism. On each of the pieces 17a and 17b, there are formed by pressing a thin film a plurality of projection 26 having elasticity. The projections 26 are brought into contact with the conductive film 16b. When the housing 15b is pushed against each of the electronic parts 14a and 14b, an electric connection is established between the housing 15b and each of the electronic parts 14a and 14b via the connecting pieces 17a and 17b, respectively. When the housings 15a and 15b are combined with each other to build the portable radio apparatus, the connecting pieces 17a and 17b can also be fixed onto the housing 15b and the printed circuit board 11 not only by the elastic force thereof but also by an engagement thereof.

In this configuration, as, described above, in the state where the electronic parts 14a and 14b arranged in the periphery of the antenna section 13 are brought into contact with the housing 15b and the grounding section 11a of the printed circuit board 11, there is formed between the antenna section 13 and the radio section 12 an electromagnetic shielding body developing an effect similar to that of the shielding case employed in the prior art. Since the outer surfaces of the electronic parts 14a and 14b are formed with a conductor material, these parts 14a and 14b are inherently shielded against electromagnetic influences. Consequently, even when the parts 14a and 14b are located near the antenna 13, the electromagnetic shielding effect against the external space is not disturbed. In this regard, although the electromagnetic shielding effect is obtained even when only one of the electronic parts 14a and 14b is formed as the electromagnetic shielding body, the shielding effect is increased when a large number of such shielding bodies are disposed in the periphery of the antenna 13. In addition, an electronic element 14 of which external surfaces are formed with a material other than a conductive material, for example, the electronic element 14c which is contained in a ceramic package and which is easily influenced from electromagnetic fields in the external space is desirably arranged at a position appropriately apart from the antenna section 13.

As above, in the portable radio apparatus according to the present invention, the radio section and the antenna section are mounted on the printed circuit board, the electrically conductive film is formed on the inner surface of the housing, and the grounding section of the printed circuit board is connected to the conductor on the inner surface of the housing via the electronic parts of the radio section and the connecting pieces disposed on the parts, thereby forming an electromagnetic shielding body for the radio section. As a result, the shielding case conventionally required to electromagnetically shield the radio section can be dispensed with, which leads to an effect of minimizing the size and weight of the portable radio communication apparatus. In addition, since the radio section is connected to the antenna section via wirings on the printed circuit board, there need not employ any mechanical parts of a large size conventionally used, which further facilitates minimization of the apparatus in its size and weight.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A portable radio communication apparatus having antenna means and radio means shielded from an external space, comprising:
   a printed circuit board having a grounding section at ground potential;

said antenna means being mounted on said printed circuit board, said radio means including electronic parts, each of said parts having a connecting terminal connected to said printed circuit board and having a conductive section formed on an outer surface thereof, said conductive section being conductively connected to said grounding section;

a housing wherein said printed circuit board, said antenna means, and said radio means are mounted, said housing having a conductive film on an inner surface thereof; and connecting means for conductively connecting the conductive section of each of said electronic parts to the conductive film on the inner surface of said housing;

said antenna means being connected electrically to said radio means via conductors of said printed circuit board;

said antenna means being mounted in a zone of said housing that is clear of said conductive film;

said antenna means having a periphery and said electronic parts being disposed in the vicinity of said periphery;

said connecting means including metal pieces and elastic projections formed on said metal pieces, and said projections connecting the conductive sections of said electronic parts to the conductive film.

2. An apparatus as claimed in claim 1, wherein said metal pieces engage said conductive film at portions thereof that are backed by exterior wall portions of said housing.

* * * * *